(12) United States Patent
Caprioli et al.

(10) Patent No.: US 10,983,773 B2
(45) Date of Patent: *Apr. 20, 2021

(54) TECHNOLOGIES FOR TRANSLATION CACHE MANAGEMENT IN BINARY TRANSLATION SYSTEMS

(71) Applicant: Intel Corporation, Santa Clara, CA (US)

(72) Inventors: Paul Caprioli, Forest Grove, OR (US); Jeffrey J. Cook, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/378,641

(22) Filed: Apr. 9, 2019

(65) Prior Publication Data

US 2019/0235849 A1 Aug. 1, 2019

Related U.S. Application Data

(63) Continuation of application No. 15/274,624, filed on Sep. 23, 2016, now Pat. No. 10,282,182.

(51) Int. Cl.
*G06F 9/45* (2006.01)
*G06F 8/52* (2018.01)
(Continued)

(52) U.S. Cl.
CPC .................. *G06F 8/52* (2013.01); *G06F 9/30* (2013.01); *G06F 9/45525* (2013.01); *G06F 12/023* (2013.01); *G06F 11/3409* (2013.01)

(58) Field of Classification Search
CPC .......... G06F 8/52; G06F 9/30; G06F 9/45525; G06F 12/023; G06F 9/30003; G06F 9/30007; G06F 9/3001; G06F 12/0238
(Continued)

(56) References Cited

U.S. PATENT DOCUMENTS 7,103,723 B2 9/2006 Cierniak
7,543,284 B2 * 6/2009 Bolton .................. G06F 8/4435
717/148

(Continued)

OTHER PUBLICATIONS

Title: Persistent code caching: Exploiting code reuse across executions and applications, author: Vijay Janapa Reddi et al, published on 2007.*

(Continued)

*Primary Examiner* — Chameli Das
(74) *Attorney, Agent, or Firm* — Hanley, Flight & Zimmerman, LLC (57) ABSTRACT

Technologies for optimized binary translation include a computing device that determines a cost-benefit metric associated with each translated code block of a translation cache. The cost-benefit metric is indicative of translation cost and performance benefit associated with the translated code block. The translation cost may be determined by measuring translation time of the translated code block. The cost-benefit metric may be calculated using a weighted cost-benefit function based on an expected workload of the computing device. In response to determining to free space in the translation cache, the computing device determines whether to discard each translated code block as a function of the cost-benefit metric. In response to determining to free space in the translation cache, the computing device may increment an iteration count and skip each translated code block if the iteration count modulo the corresponding cost-benefit metric is non-zero. Other embodiments are described and claimed.

20 Claims, 3 Drawing Sheets

(51) Int. Cl.
  *G06F 9/455* (2018.01)
  *G06F 12/02* (2006.01)
  *G06F 9/30* (2018.01)
  *G06F 11/34* (2006.01)
(58) Field of Classification Search
  USPC .................................................. 717/139, 151
  See application file for complete search history.

(56) References Cited

U.S. PATENT DOCUMENTS

| | | | | |
|---|---|---|---|---|
| 7,725,885 | B1 | 5/2010 | Pradhan et al. | |
| 7,962,900 | B2* | 6/2011 | Barraclough | G06F 9/30072 |
| | | | | 717/128 |
| 8,479,176 | B2 | 7/2013 | Ottoni et al. | |
| 8,688,432 | B2* | 4/2014 | Gheith | G06F 12/0223 |
| | | | | 703/23 |
| 8,756,591 | B2* | 6/2014 | Gschwind | G06F 9/3016 |
| | | | | 717/151 |
| 8,856,761 | B2 | 10/2014 | Maeda et al. | |
| 9,268,543 | B1* | 2/2016 | Doyle | G06F 9/45525 |
| 9,405,596 | B2 | 8/2016 | Boettiger et al. | |
| 10,282,182 | B2 | 5/2019 | Caprioli et al. | |
| 2001/0052117 | A1 | 12/2001 | Holzle et al. | |
| 2003/0101439 | A1* | 5/2003 | Desoli | G06F 9/45516 |
| | | | | 717/148 |
| 2004/0168028 | A1* | 8/2004 | Cierniak | G06F 8/4434 |
| | | | | 711/125 |
| 2004/0221278 | A1* | 11/2004 | Dankel | G06F 9/3836 |
| | | | | 717/139 |
| 2005/0235271 | A1* | 10/2005 | Sanyal | G06F 8/52 |
| | | | | 717/136 |
| 2007/0079304 | A1* | 4/2007 | Zheng | G06F 9/45516 |
| | | | | 717/151 |
| 2009/0100416 | A1* | 4/2009 | Brown | G06F 9/45516 |
| | | | | 717/153 |
| 2011/0307876 | A1* | 12/2011 | Ottoni | G06F 9/45525 |
| | | | | 717/153 |
| 2012/0233477 | A1* | 9/2012 | Wu | G06F 9/5094 |
| | | | | 713/320 |
| 2012/0239912 | A1* | 9/2012 | Maeda | G06F 12/02 |
| | | | | 712/226 |
| 2013/0139137 | A1 | 5/2013 | Zhao | |
| 2014/0095778 | A1 | 4/2014 | Chung et al. | |
| 2015/0113229 | A1 | 4/2015 | Boettiger et al. | |
| 2016/0357528 | A1* | 12/2016 | Kanhere | G06F 9/384 |

OTHER PUBLICATIONS

Title: Dynamic binary translation and optimization; author: K Ebcioglu, Published on 2001; source IEEE.*
Title: HERMES: a fast cross-ISA binary translator with post-optimization, author: X Zhang, Published on 2015; source: IEEE.*
Secure and practical defense against code-injection attacks using software dynamic translation, author: W Hu et al, published on 2006.*
United States Patent and Trademark Office, "Non-Final Office Action," dated Jan. 18, 2018 in connection with U.S. Appl. No. 15/274,624, 14 pages.
United States Patent and Trademark Office, "Final Office Action," dated Jun. 25, 2018 in connection with U.S. Appl. No. 15/274,624, 14 pages.
United States Patent and Trademark Office, "Advisory Action," dated Nov. 9, 2018 in connection with U.S. Appl. No. 15/274,624, 3 pages.
United States Patent and Trademark Office, "Notice of Allowance," dated Dec. 31, 2018 in connection with U.S. Appl. No. 15/274,624, 8 pages.
Hazelwood et al., "Code Cache Management Schemes for Dynamic Optimizers," Proceedings of the Sixth Annual Workshop on Interaction between Compilers and Computer Architectures (INTERACT-02), Feb. 3, 2002, pp. 1-9, 9 pages.

* cited by examiner

TECHNOLOGIES FOR TRANSLATION CACHE MANAGEMENT IN BINARY TRANSLATION SYSTEMS

CROSS-REFERENCE TO RELATED APPLICATION

The present application is a continuation application of U.S. application Ser. No. 15/274,624, entitled "TECHNOLOGIES FOR TRANSLATION CACHE MANAGEMENT IN BINARY TRANSLATION SYSTEMS," which was filed on Sep. 23, 2016.

BACKGROUND

Computer processors typically execute binary code encoded in a particular instruction set. Binary translation translates binary code targeted for a particular instruction set into translated binary code, generally targeted for another instruction set. Binary translation may be used to enable backward- or forward-compatibility for software applications, or to improve processing efficiency. For example, binary code targeted for a reduced instruction set computing (RISC) architecture such as PowerPC may be translated into binary code targeting a complex instruction set computing (CISC) architecture such as IA-32, allowing legacy applications to run on newer hardware. As another example, binary translation may generate translated binary code targeting the same computer architecture but optimized by using newer features such as wider instructions, improved vector instructions, or the like. Binary translation may be dynamic, that is, the code may be translated as it is executed. Certain binary translation systems may establish one or more translation caches (T-caches) to store translated binary code. A translation cache may have limited storage space, and typical binary translation systems use a least-recently-used (LRU) policy to identify translated code for eviction from the translation cache.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
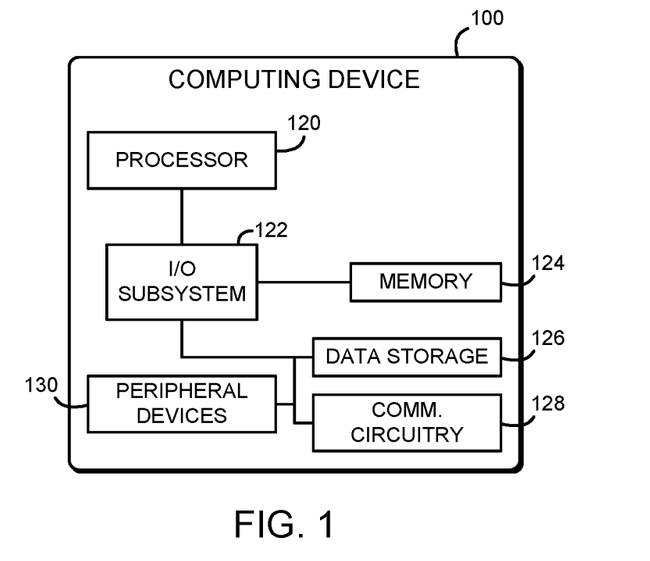
FIG. 1 is a simplified block diagram of at least one embodiment of a computing device for translation cache management for binary translation.

Referring now to FIG. 1, in an illustrative embodiment, a computing device 100 for translation cache management in a binary translation system includes a processor 120 and memory 124. In use, as described further below, the computing device 100 translates original binary code into translated code and stores translated code blocks in a translation cache, which may be stored in the memory 124. The computing device 100 assigns a cost-benefit metric to each translated code block in the translation cache, which represents the relative cost of translation and the associated performance benefit for each translated code block. When the computing device 100 frees space in the translation cache, the computing device 100 favors evicting translated code blocks with relatively low associated cost-benefit metrics. Thus, the computing device 100 may preferably retain translated code blocks that are associated with relatively longer up-front translation time and/or that provide greater performance benefit. The computing device 100 may reduce system overhead associated with the binary translation process and may retain code in the translation cache that provides the greatest value to the user in terms of performance and power efficiency. Accordingly, the computing device 100 may improve performance and/or power efficiency for binary translation systems compared to other translation cache eviction policies.

The computing device 100 may be embodied as any type of computation or computer device capable of performing the functions described herein, including, without limitation, a computer, a desktop computer, a workstation, a server, a laptop computer, a notebook computer, a tablet computer, a mobile computing device, a wearable computing device, a network appliance, a web appliance, a distributed computing system, a processor-based system, and/or a consumer electronic device. As shown in FIG. 1, the computing device 100 illustratively includes a processor 120, an input/output subsystem 122, a memory 124, a data storage device 126, and a communication subsystem 128. Of course, the computing device 100 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the computing device 100 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the computing device 100. For example, the I/O subsystem 122 may be embodied as, or otherwise include, memory controller hubs, input/output control hubs, platform controller hubs, integrated control circuitry, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the computing device 100, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the computing device 100 may be embodied as any communication circuit, device, or collection thereof, capable of enabling communications between the computing device 100 and other remote devices over a network. The communication subsystem 128 may be configured to use any one or more communication technology (e.g., wired or wireless communications) and associated protocols (e.g., Ethernet, Bluetooth®, Wi-Fi®, WiMAX, etc.) to effect such communication.

As shown, the computing device 100 may also include one or more peripheral devices 130. The peripheral devices 130 may include any number of additional input/output devices, interface devices, and/or other peripheral devices. For example, in some embodiments, the peripheral devices 130 may include a display, touch screen, graphics circuitry, keyboard, mouse, speaker system, microphone, network interface, and/or other input/output devices, interface devices, and/or other peripheral devices.

Figure 2:
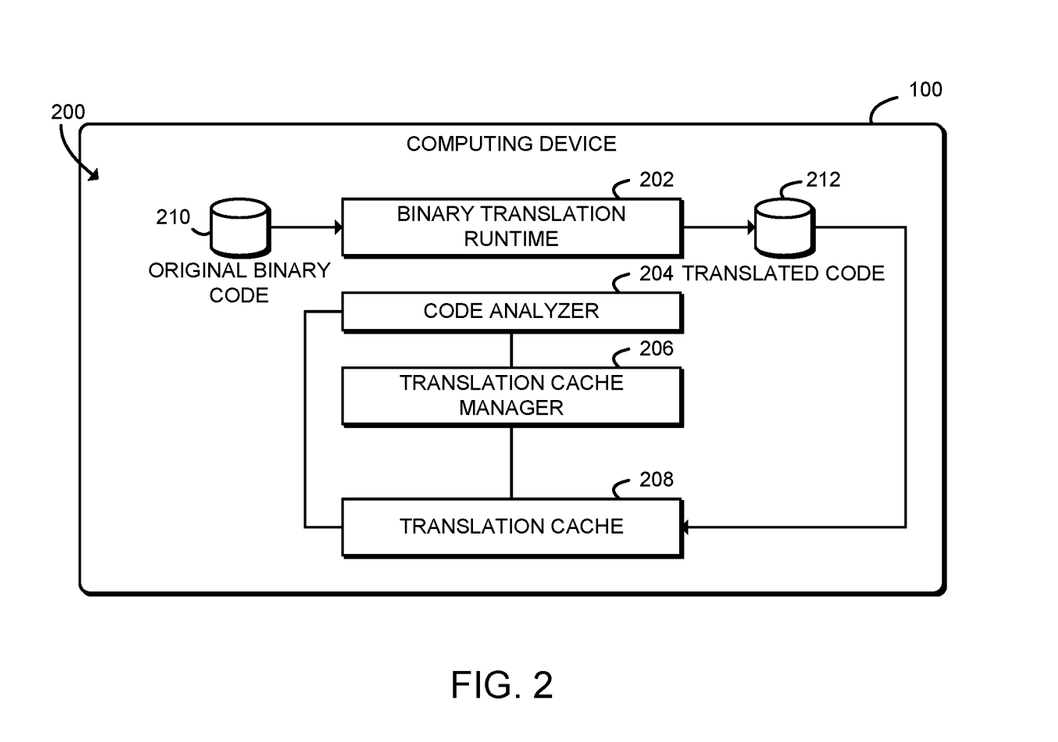
FIG. 2 is a simplified block diagram of at least one embodiment of an environment that may be established by the computing device of FIG. 1.

Referring now to FIG. 2, in an illustrative embodiment, the computing device 100 establishes an environment 200 during operation. The illustrative environment 200 includes a binary translation runtime 202, a code analyzer 204, and a translation cache manager 206. The various components of the environment 200 may be embodied as hardware, firmware, software, or a combination thereof. As such, in some embodiments, one or more of the components of the environment 200 may be embodied as circuitry or collection of electrical devices (e.g., binary translation circuitry 202, code analyzer circuitry 204, and/or translation cache manager circuitry 206). It should be appreciated that, in such embodiments, one or more of the binary translation circuitry 202, the code analyzer circuitry 204, and/or the translation cache manager circuitry 206 may form a portion of one or more of the processor 120, the I/O subsystem 122, and/or other components of the computing device 100. Additionally, in some embodiments, one or more of the illustrative components may form a portion of another component and/or one or more of the illustrative components may be independent of one another.

The binary translation runtime 202 is configured to translate an original binary code 210 to generate translated code 212. The original binary code 210 may be embodied as any machine code, bytecode, or other executable computer code. The original binary code 210 may or may not be natively executable by the processor 120 of the computing device 100. Similarly, the translated code 212 may be embodied as any machine code, bytecode, or other computer code that may be executed by the processor 120, including natively executable code. The translated code 212 may include multiple translated code blocks that may be stored in a translation cache 208, described further below. The binary translation runtime 202 is further configured to determine whether to free space in the translation cache 208, for example in response to generating new translated code 212.

The code analyzer 204 is configured to determine a cost-benefit metric associated with each translated code block of the translation cache 208. The cost-benefit metric is indicative of a translation time for the corresponding translated code block and a performance benefit for the corresponding translated code block. The code analyzer 204 may be configured to measure or estimate the translation time for each translated code block, and may be configured to determine the performance benefit for each translated code block based on an analytical model of the computing device 100.

The translation cache manager 206 is configured to determine whether to discard translated code blocks in the translation cache 208 as a function of the cost-benefit metric of the corresponding translated code block and then discard those translated code blocks in response to determining to free space in the translation cache 208. In some embodiments, the translation cache manager 206 may be further configured to determine whether to discard translated code blocks as a function of the age of the corresponding translated code block, and to discard translated code blocks based on both the corresponding cost-benefit metric and the age. In some embodiments, the translation cache manager 206 may be further configured to increment an iteration count in response to determining to free space in the translation cache and to determine whether to discard translated code blocks as a function of the corresponding cost-benefit metric and the iteration count.

As described above, the translated code blocks are stored in the translation cache 208. The translation cache 208 may also store related metadata such as the corresponding cost-benefit metrics, age bits, or other metadata related to the translated code 212. The translation cache 208 may be stored in the memory 124, in a dedicated cache of the processor 120, or in any other appropriate storage of the computing device 100.

Figure 3:
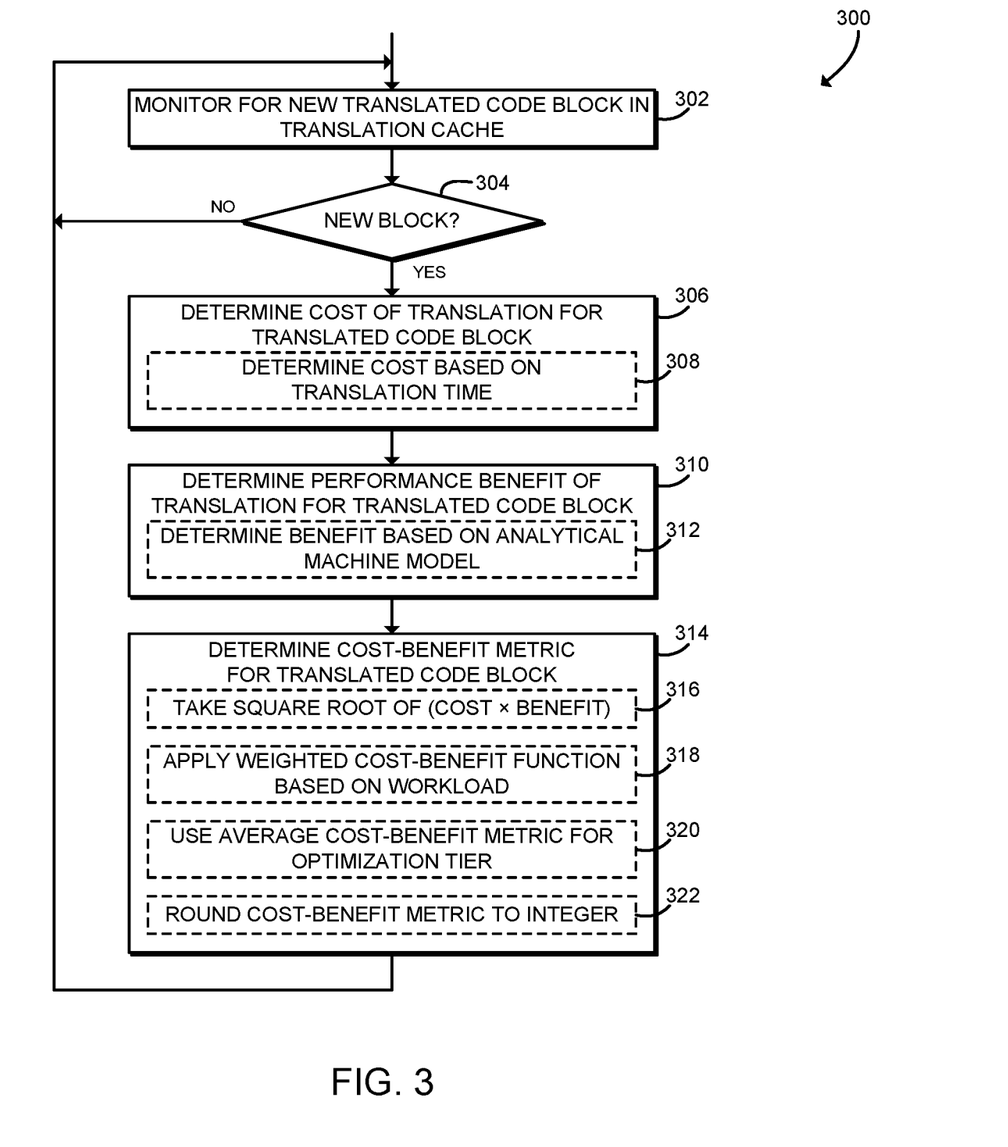
FIG. 3 is a simplified flow diagram of at least one embodiment of a method for determining a cost-benefit metric that may be executed by the computing device of FIGS. 1-2.

Referring now to FIG. 3, in use, the computing device 100 may execute a method 300 for determining a cost-benefit metric. It should be appreciated that, in some embodiments, the operations of the method 300 may be performed by one or more components of the environment 200 of the computing device 100 as shown in FIG. 2. The method 300 begins in block 302, in which the computing device 100 monitors for a new translated code block in the translation cache 208. The new translated code block may be embodied as any block, segment, or other unit of translated code 212 that is not yet associated with cost-benefit metric data. For example, the translated code block may be dynamically translated, loaded, or otherwise generated from the original binary code 210 and stored in the translation cache 208. In block 304, the computing device 100 determines whether a new translated code block exists. If not, the method 300 loops back to block 302 to continue monitoring for new translated code blocks. If a new translated code block is detected, the method 300 advances to block 306.

In block 306, the computing device 100 determines a cost of translation value for the translated code block. The cost of translation value may be embodied as any numeric value indicative of the relative computational effort required to translate the original code 210 into the translated code block. In some embodiments, in block 308 the cost of translation may be determined based on the time required to complete translation. The computing device 100 may, for example, determine the amount of time required to actually perform the translation (e.g., by comparing values of a timestamp counter from before and after translation) and/or estimate the amount of time required to perform the translation. More-complicated translations that require additional translation time thus are assigned larger cost of translation values.

In block 310, the computing device 100 determines a performance benefit of translation value for the translated code block. The performance benefit may be embodied as any numeric value indicative of the relative performance gain provided by the translated code block over the corresponding original code 210. Thus, a binary translation that produces more heavily optimized translated code 212 may be assigned relatively higher performance benefit values. In some embodiments, in block 312 the computing device 100 may determine the performance benefit based on an approximate analytical machine model of the computing device 100 and/or its components. The analytical model may determine the performance benefit by determining the difference in the number and/or class of operations needed to execute the translated code as compared to the original code 210. The analytical model may, for example, estimate performance using the change in operation count for each class of operation (e.g., loads, stores, arithmetic operations, etc.) together with a basic machine description (e.g., port bindings of instruction classes to execution units, instruction latencies, etc.).

In block 314, the computing device 100 determines a cost-benefit metric for the translated code block. The cost-benefit metric may be embodied as any value indicative of the translation cost and performance benefit associated with translating the original binary code 210 into the translated code block. Relatively higher cost-benefit metric values indicate that the translated code block requires a relatively larger translation time and/or a relatively larger performance benefit. For example, more intensive optimizations that require lengthy translation in order to produce well-optimized translated code 212 may be assigned relatively higher cost-benefit metric values. The calculated cost-benefit metric may be stored, for example, as metadata related to the translated code block in the translation cache 208.

In some embodiments, in block 316 the computing device 100 may determine the cost-benefit metric by taking the square root of the product of the cost of translation value multiplied by the performance benefit of translation value, as shown below in Equation 1. This illustrative cost-benefit metric may provide a balanced cost-benefit metric appropriate for many workloads. In some embodiments, in block 318 the computing device 100 may apply a weighted cost-benefit function that is determined based on the expected workload of the computing device 100. For example, a server computing device 100 that executes long-running processes may favor performance over initial translation cost and thus may calculate the cost-benefit metric as the cube root of the product of the translation cost times the translation benefit squared as shown below in Equation 2. As another example, a mobile computing device 100, wearable computing device 100, or other personal device may favor responsiveness and thus may calculate the cost-benefit metric as the cube root of the product of the translation cost squared times the translation benefit as shown below in Equation 3.

$$\text{metric} = \sqrt{\text{cost} \cdot \text{benefit}} \qquad (1)$$

$$\text{metric} = \sqrt[3]{\text{cost} \cdot \text{benefit} \cdot \text{benefit}} \qquad (2)$$

$$\text{metric} = \sqrt[3]{\text{cost} \cdot \text{cost} \cdot \text{benefit}} \qquad (3)$$

In some embodiments, in block 320 the computing device 100 may use an average cost-benefit metric for the optimization tier associated with the translated code block. Many binary translation systems employ optimization tiers or "gears." In the first gear, the binary translation system performs quick, low-cost optimizations that provide relatively small performance benefits but require little translation time. In the higher gears, the binary translation system may perform more intensive, higher-cost optimizations that require additional translation time but generate additional performance gains. The different optimization gears may each provide a similar cost-benefit ratio, but the higher gears tend to pay more up-front cost in exchange for greater performance benefit. Higher gears may be used for hotter (that is, longer-running) code. The average cost-benefit metric used for each optimization tier may be predetermined or otherwise configured prior to executing the method 300. For example, in an illustrative embodiment, the cost-benefit metric for the first optimization tier may be the integer value two and the cost-benefit metric for the second optimization tier may be the integer value six. Thus, in some embodiments, the computing device 100 may not measure or otherwise determine the translation time or the performance benefit associated with each individual translated code block.

In some embodiments, in block 322 the computing device 100 may round the cost-benefit metric to an integer value. Rounding the cost-benefit metric to an integer may simplify translation cache management and improve performance, for example by avoiding the use of floating point calculations. After determining the cost-benefit metric, the method 300 loops back to block 302 to continue monitoring for new translated coded blocks.

Figure 4:
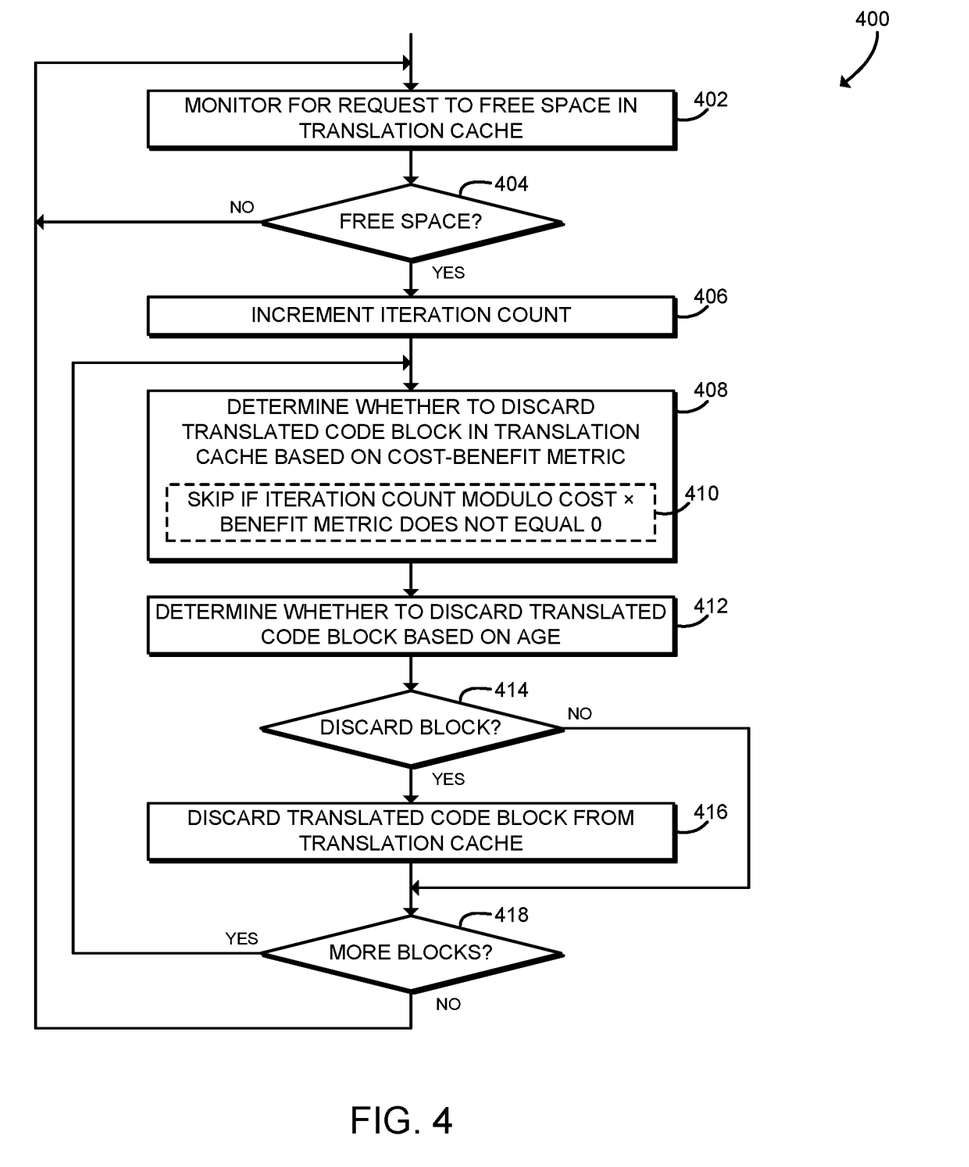
FIG. 4 is a simplified flow diagram of at least one embodiment of a method for translation cache management that may be executed by the computing device of FIGS. 1-2.

Referring now to FIG. 4, in use, the computing device 100 may execute a method 400 for translation cache management. It should be appreciated that, in some embodiments, the operations of the method 400 may be performed by one or more components of the environment 200 of the computing device 100 as shown in FIG. 2. The method 400 begins in block 402, in which the computing device 100 monitors for a request to free space in the translation cache 208. The request may be generated, for example by the binary translation runtime 202 when the translation cache 208 does not have room for a new translated code block or when the translation cache 208 is otherwise low on free space. In some embodiments, the request to free space in the translation cache 208 may be generated periodically or repeatedly and not directly in response to running out of space in the translation cache 208. In block 404, the computing device 100 determines whether a request to free space in the translation cache 208 has been received. If not, the method 400 loops back to block 402 to continue monitoring for requests to free space in the translation cache 208. If a request to free space has been detected, the method 400 advances to block 406.

In block 406, the computing device 100 increments an iteration count. The iteration count may be embodied as an integer variable or other storage location and may be initialized to zero. The iteration count is indicative of the number of requests to free space in the translation cache 208 that have been processed by the computing device 100.

In block 408, the computing device 100 determines whether to discard a translated code block in the translation cache 208 based on the associated cost-benefit metric. As described further below, the computing device 100 sweeps through all of the translated code blocks stored in the translation cache 208 to identify translated code blocks to be evicted from the translation cache 208. The computing device 100 favors evicting translated code blocks with a lower associated cost-benefit metric and retaining translated code blocks with a higher associated cost-benefit metric. Thus, the computing device 100 tends to avoid discarding translated code blocks that would require more computationally intensive binary translation to regenerate. In some embodiments, in block 410 the computing device 100 may skip discarding a translated code block if the iteration count modulo the cost-benefit metric does not equal zero. Expressed as pseudocode, the computing device 100 may skip the translation block if iteration count % metric !=0. For example, for a translated code block with cost-benefit metric equal to one, the iteration count modulo one is always zero and thus the computing device 100 may never skip such translation blocks. As another example, for a translated code block with cost-benefit metric equal to two, the iteration count modulo two is zero for every other iteration and thus the computing device 100 may skip such translated code blocks every other iteration. Thus, in the illustrative embodiment, translated code blocks with higher cost-benefit metrics are skipped more often and thus are not considered for eviction from the translation cache 208 as often as translated code blocks with lower cost-benefit metrics. The computing device 100 effectively divides the translation cache 208 into different logical regions according to the cost-benefit metric, and regions that are ranked higher according to the cost-benefit metric are more likely to be retained.

In block 412, the computing device 100 determines whether to discard the translated code block based on its age. The binary translation runtime 202 may maintain one or more age bits associated with each translated code block. The age bits indicate how recently the associated translated code block was executed. The computing device 100 may use any appropriate aging algorithm to determine whether to discard the translated code block. For example, the computing device 100 may discard the least-recently-used translated code blocks, that is, the translated code blocks that were last executed the longest time ago.

In block 414, the computing device 100 determines whether to discard the translated code block. The determination to discard a translated code block is based on both the cost-benefit metric determination described in connection with block 408 and the age determination described in connection with block 412. In other words, the translated code block is not discarded if it is skipped based on the corresponding cost-benefit metric or if it is skipped based on its corresponding age. If the translated code block is not to be discarded, the method 400 branches ahead to block 418, described below. If the translated code block is to be discarded, the method 400 advances to block 416, in which the computing device 100 discards the translated code block from the translation cache 208. The computing device 100 may free or otherwise allow the storage space associated with the translated code block to be reused for new translations.

In block 418, the computing device 100 determines whether to analyze additional translated code blocks in the translation cache 208. As described above, the computing device 100 may sweep through all of the translated code blocks stored in the translation cache 208. If additional translated code blocks remain in the translation cache 208 to be analyzed, the method 400 loops back to block 408 to determine whether to discard those translated code blocks. If no additional translated code blocks remain (i.e., if all translated code blocks in the translation cache 208 have been processed), the method 400 loops back to block 402 to continue monitoring for requests to free space in the translation cache 208.

It should be appreciated that, in some embodiments, the methods 300 and/or 400 may be embodied as various instructions stored on a computer-readable media, which may be executed by the processor 120, the I/O subsystem 122, and/or other components of the computing device 100 to cause the computing device 100 to perform the respective method 300 and/or 400. The computer-readable media may be embodied as any type of media capable of being read by the computing device 100 including, but not limited to, the memory 124, the data storage device 126, microcode of the processor 120, firmware devices, other memory or data storage devices of the computing device 100, portable media readable by a peripheral device of the computing device 100, and/or other media.

EXAMPLES

Illustrative examples of the technologies disclosed herein are provided below. An embodiment of the technologies may include any one or more, and any combination of, the examples described below.

Example 1 includes a computing device for optimized binary translation, the computing device comprising: a code analyzer to determine a cost-benefit metric associated with each translated code block of a translation cache, wherein each cost-benefit metric is indicative of a translation time for the corresponding translated code block and a performance benefit for the corresponding translated code block; a binary translation runtime to determine whether to free space in the translation cache; and a translation cache manager to (i) determine whether to discard a first translated code block in the translation cache as a function of the cost-benefit metric of the first translated code block in response to a determination to free space in the translation cache; and (ii) discard the first translated code block in response to a determination to discard the first translated code block as a function of the cost-benefit metric.

Example 2 includes the subject matter of Example 1, and wherein: the binary translation runtime is further to translate an original binary code to generate the first translated code block; and to determine the cost-benefit metric associated with the first translated code block comprises to determine the cost-benefit metric associated with the first translated code block in response to translation of the original binary code.

Example 3 includes the subject matter of any of Examples 1 and 2, and wherein to determine the cost-benefit metric comprises to measure the translation time for each translated code block.

Example 4 includes the subject matter of any of Examples 1-3, and wherein to determine the cost-benefit metric comprises to estimate the translation time for each translated code block.

Example 5 includes the subject matter of any of Examples 1-4, and wherein to determine the cost-benefit metric comprises to determine the performance benefit for each translated code block based on an analytical model of the computing device.

Example 6 includes the subject matter of any of Examples 1-5, and wherein to determine the cost-benefit metric comprises to multiply the translation time by the performance benefit.

Example 7 includes the subject matter of any of Examples 1-6, and wherein to determine the cost-benefit metric comprises to apply a weighted cost-benefit function based on an expected workload of the computing device.

Example 8 includes the subject matter of any of Examples 1-7, and wherein to determine the cost-benefit metric comprises to select an average cost-benefit metric based on an optimization tier associated with the corresponding translated code block.

Example 9 includes the subject matter of any of Examples 1-8, and wherein to determine the cost-benefit metric comprises to round the cost-benefit metric to an integer value.

Example 10 includes the subject matter of any of Examples 1-9, and wherein: the translation cache manager is further to increment an iteration count in response to the determination to free space in the translation cache; to determine whether to discard the first translated code block in the translation cache further comprises to determine whether to discard the first translated code block in the translation cache as a function of the cost-benefit metric of the first translated code block and the iteration count; and to discard the first translated code block comprises to discard the first translated code block in response to a determination to discard the first translated code block as a function of the cost-benefit metric of the first translated code block and the iteration count.

Example 11 includes the subject matter of any of Examples 1-10, and wherein to determine whether to discard the first translated code block comprises to: determine whether the iteration count modulo the cost benefit metric of the first translated code block does not equal zero; and skip a discard of the first translated code block in response to determining that the iteration count modulo the cost benefit metric of the first translated code block does not equal zero.

Example 12 includes the subject matter of any of Examples 1-11, and wherein: the translation cache manager is further to determine whether to discard the first translated code block as a function of an age of the first translated code block in response to the determination to free space in the translation cache; and to discard the first translated code block comprises to discard the first translated code block in response to the determination to discard the first translated code block as a function of the cost-benefit metric and a determination to discard the first translated code block as a function of the age of the first translated code block.

Example 13 includes a method for optimized binary translation, the method comprising: determining, by a computing device, a cost-benefit metric associated with each translated code block of a translation cache, wherein each cost-benefit metric is indicative of a translation time for the corresponding translated code block and a performance benefit for the corresponding translated code block; determining, by the computing device, whether to free space in the translation cache; determining, by the computing device, whether to discard a first translated code block in the translation cache as a function of the cost-benefit metric of the first translated code block in response to determining to free space in the translation cache; and discarding, by the computing device, the first translated code block in response to determining to discard the first translated code block as a function of the cost-benefit metric.

Example 14 includes the subject matter of Example 13, and further comprising: translating, by the computing device, an original binary code to generate the first translated code block; wherein determining the cost-benefit metric associated with the first translated code block comprises determining the cost-benefit metric associated with the first translated code block in response to translating the original binary code.

Example 15 includes the subject matter of any of Examples 13 and 14, and wherein determining the cost-benefit metric comprises measuring the translation time for each translated code block.

Example 16 includes the subject matter of any of Examples 13-15, and wherein determining the cost-benefit metric comprises estimating the translation time for each translated code block.

Example 17 includes the subject matter of any of Examples 13-16, and wherein determining the cost-benefit metric comprises determining the performance benefit for each translated code block based on an analytical model of the computing device.

Example 18 includes the subject matter of any of Examples 13-17, and wherein determining the cost-benefit metric comprises multiplying the translation time by the performance benefit.

Example 19 includes the subject matter of any of Examples 13-18, and wherein determining the cost-benefit metric comprises applying a weighted cost-benefit function based on an expected workload of the computing device.

Example 20 includes the subject matter of any of Examples 13-19, and wherein determining the cost-benefit metric comprises selecting an average cost-benefit metric based on an optimization tier associated with the corresponding translated code block.

Example 21 includes the subject matter of any of Examples 13-20, and wherein determining the cost-benefit metric comprises rounding the cost-benefit metric to an integer value.

Example 22 includes the subject matter of any of Examples 13-21, and further comprising: incrementing, by the computing device, an iteration count in response to determining to free space in the translation cache; wherein determining whether to discard the first translated code block in the translation cache further comprises determining whether to discard the first translated code block in the translation cache as a function of the cost-benefit metric of the first translated code block and the iteration count; and wherein discarding the first translated code block comprises discarding the first translated code block in response to determining to discard the first translated code block as a function of the cost-benefit metric of the first translated code block and the iteration count.

Example 23 includes the subject matter of any of Examples 13-22, and wherein determining whether to discard the first translated code block comprises: determining whether the iteration count modulo the cost benefit metric of the first translated code block does not equal zero; and skipping a discard of the first translated code block in response to determining that the iteration count modulo the cost benefit metric of the first translated code block does not equal zero.

Example 24 includes the subject matter of any of Examples 13-23, and further comprising: determining, by the computing device, whether to discard the first translated code block as a function of an age of the first translated code block in response to determining to free space in the translation cache; wherein discarding the first translated code block comprises discarding the first translated code block in response to determining to discard the first translated code block as a function of the cost-benefit metric and determining to discard the first translated code block as a function of the age of the first translated code block.

Example 25 includes a computing device comprising: a processor; and a memory having stored therein a plurality of instructions that when executed by the processor cause the computing device to perform the method of any of Examples 13-24.

Example 26 includes one or more machine readable storage media comprising a plurality of instructions stored thereon that in response to being executed result in a computing device performing the method of any of Examples 13-24.

Example 27 includes a computing device comprising means for performing the method of any of Examples 13-24.

Example 28 includes a computing device for optimized binary translation, the computing device comprising: means for determining a cost-benefit metric associated with each translated code block of a translation cache, wherein each cost-benefit metric is indicative of a translation time for the corresponding translated code block and a performance benefit for the corresponding translated code block; means for determining whether to free space in the translation cache; means for determining whether to discard a first translated code block in the translation cache as a function of the cost-benefit metric of the first translated code block in response to determining to free space in the translation cache; and means for discarding the first translated code block in response to determining to discard the first translated code block as a function of the cost-benefit metric.

Example 29 includes the subject matter of Example 28, and further comprising: means for translating an original binary code to generate the first translated code block; wherein the means for determining the cost-benefit metric associated with the first translated code block comprises means for determining the cost-benefit metric associated with the first translated code block in response to translating the original binary code.

Example 30 includes the subject matter of any of Examples 28 and 29, and wherein the means for determining the cost-benefit metric comprises means for measuring the translation time for each translated code block.

Example 31 includes the subject matter of any of Examples 28-30, and wherein the means for determining the cost-benefit metric comprises means for estimating the translation time for each translated code block.

Example 32 includes the subject matter of any of Examples 28-31, and wherein the means for determining the cost-benefit metric comprises means for determining the performance benefit for each translated code block based on an analytical model of the computing device.

Example 33 includes the subject matter of any of Examples 28-32, and wherein the means for determining the cost-benefit metric comprises means for multiplying the translation time by the performance benefit.

Example 34 includes the subject matter of any of Examples 28-33, and wherein the means for determining the cost-benefit metric comprises means for applying a weighted cost-benefit function based on an expected workload of the computing device.

Example 35 includes the subject matter of any of Examples 28-34, and wherein the means for determining the cost-benefit metric comprises means for selecting an average cost-benefit metric based on an optimization tier associated with the corresponding translated code block.

Example 36 includes the subject matter of any of Examples 28-35, and wherein the means for determining the cost-benefit metric comprises means for rounding the cost-benefit metric to an integer value.

Example 37 includes the subject matter of any of Examples 28-36, and further comprising: means for incrementing an iteration count in response to determining to free space in the translation cache; wherein the means for determining whether to discard the first translated code block in the translation cache further comprises means for determining whether to discard the first translated code block in the translation cache as a function of the cost-benefit metric of the first translated code block and the iteration count; and wherein the means for discarding the first translated code block comprises means for discarding the first translated code block in response to determining to discard the first translated code block as a function of the cost-benefit metric of the first translated code block and the iteration count.

Example 38 includes the subject matter of any of Examples 28-37, and wherein the means for determining whether to discard the first translated code block comprises: means for determining whether the iteration count modulo the cost benefit metric of the first translated code block does not equal zero; and means for skipping a discard of the first translated code block in response to determining that the iteration count modulo the cost benefit metric of the first translated code block does not equal zero.

Example 39 includes the subject matter of any of Examples 28-38, and further comprising: means for determining whether to discard the first translated code block as a function of an age of the first translated code block in response to determining to free space in the translation cache; wherein the means for discarding the first translated code block comprises means for discarding the first translated code block in response to determining to discard the first translated code block as a function of the cost-benefit metric and determining to discard the first translated code block as a function of the age of the first translated code block.

The invention claimed is:

1. A computing device for optimized binary translation, the computing device comprising a processor, causing the processor to execute:
   a code analyzer to determine cost-benefit metrics associated with ones of a plurality of translated code blocks of a translation cache, a first one of the cost-benefit metrics determined as a function of a cube root of a product of a translation time for a corresponding one of the translated code blocks multiplied by a square of a performance benefit for the corresponding one of the translated code blocks, the translation time corresponding to an amount of elapsed time for translation of the corresponding one of the translated code blocks, and the performance benefit to include a numeric value indicative of a performance gain of the corresponding one of the translated code blocks relative to a performance value of a corresponding original code block; and
   a translation cache manager to (i) determine whether to discard a first translated code block in the translation cache as a function of the first one of the cost-benefit metrics of the first translated code block in response to a determination to free space in the translation cache; and (ii) discard the first translated code block in response to a determination to discard the first translated code block as a function of the first one of the cost-benefit metrics.

2. The computing device of claim 1, further including a binary translation runtime to translate an original binary code to generate the first translated code block, the code analyzer to determine the first one of the cost-benefit metrics associated with the first translated code block in response to translation of the original binary code.

3. The computing device of claim 1, wherein the code analyzer is to determine the first one of the cost-benefit metrics based on a measurement of the translation time for the corresponding one of the translated code blocks.

4. The computing device of claim 1, wherein the code analyzer is to determine the first one of the cost-benefit metrics based on an estimate of the translation time for the corresponding one of the translated code blocks.

5. The computing device of claim 1, wherein the code analyzer is to determine the first one of the cost-benefit metrics by determining the performance benefit for the corresponding one of the translated code blocks based on an analytical model of the computing device.

6. The computing device of claim 1, wherein the translation cache manager is to:
   increment an iteration count in response to the determination to free space in the translation cache;
   determine whether to discard the first translated code block in the translation cache as a function of the first one of the cost-benefit metrics of the first translated code block and the iteration count; and
   discard the first translated code block in response to a determination to discard the first translated code block as a function of the first one of the cost-benefit metrics of the first translated code block and the iteration count.

7. The computing device of claim 6, wherein the translation cache manager is to determine whether to discard the first translated code block by:
   determining whether the iteration count modulo the first one of the cost-benefit metrics of the first translated code block does not equal zero; and
   skipping a discard of the first translated code block in response to determining that the iteration count modulo the first one of the cost-benefit metrics of the first translated code block does not equal zero.

8. The computing device of claim 1, wherein the translation cache manager is to:
   determine whether to discard the first translated code block as a function of an age of the first translated code block in response to the determination to free space in the translation cache; and
   discard the first translated code block in response to the determination to discard the first translated code block as a function of the first one of the cost-benefit metrics and a determination to discard the first translated code block as a function of the age of the first translated code block.

9. At least one device or at least one storage disk comprising instructions that in response to being executed cause a computing device to at least:
   determine cost-benefit metrics associated with ones of a plurality of translated code blocks of a translation cache, a first one of the cost-benefit metrics determined as a function of a cube root of a product of a translation time for a corresponding one of the translated code blocks multiplied by a square of a performance benefit for the corresponding one of the translated code blocks, the translation time corresponding to an amount of elapsed time for translation of the corresponding one of the translated code blocks, and the performance benefit comprises to include a numeric value indicative of a performance gain of the corresponding one of the translated code blocks relative to a performance value of a corresponding original code block;
   determine whether to discard a first translated code block in the translation cache as a function of the first one of the cost-benefit metrics of the first translated code block in response to determining to free space in the translation cache; and
   discard the first translated code block in response to determining to discard the first translated code block as a function of the first one of the cost-benefit metrics.

10. The at least one storage device or at least one storage disk of claim 9, wherein the instructions are to cause the computing device to determine the first one of the cost-benefit metrics based on the translation time for the corresponding one of the translated code blocks.

11. The at least one storage device or at least one storage disk of claim 9, wherein the instructions are to cause the computing device to determine the first one of the cost-benefit metrics based on the translation time for the ones of the translated code blocks.

12. The at least one storage device or at least one storage disk of claim 9, wherein the instructions are to cause the computing device to determine the first one of the cost-benefit metrics by determining the performance benefit for the corresponding one of the translated code blocks based on an analytical model of the computing device.

13. The at least one storage device or at least one storage disk of claim 9, wherein the instructions are to cause the computing device to:

increment an iteration count in response to determining to free space in the translation cache;

determine whether to discard the first translated code block in the translation cache as a function of the first one of the cost-benefit metrics of the first translated code block and the iteration count; and discard the first translated code block in response to determining to discard the first translated code block as a function of the first one of the cost-benefit metrics of the first translated code block and the iteration count.

14. The at least one storage device or at least one storage disk of claim 13, wherein the instructions are to cause the computing device to determine whether to discard the first translated code block by:

determining whether the iteration count modulo the first one of the cost-benefit metrics of the first translated code block does not equal zero; and skipping a discard of the first translated code block in response to determining that the iteration count modulo the first one of the cost-benefit metrics of the first translated code block does not equal zero.

15. At least one storage device or at least one storage disk comprising instructions that in response to being executed cause a computing device to at least:

determine cost-benefit metrics associated with ones of a plurality of translated code blocks of a translation cache, a first one of the cost-benefit metrics determined as a function of a cube root of a product of a square of a translation time for a corresponding one of the translated code blocks multiplied by a performance benefit for the corresponding one of the translated code blocks, the translation time corresponding to an amount of elapsed time for translation of the corresponding one of the translated code blocks, and the performance benefit to include a numeric value indicative of a performance gain of the corresponding one of the translated code blocks relative to a performance value of a corresponding original code block;

determine whether to discard a first translated code block in the translation cache as a function of the first one of the cost-benefit metrics of the first translated code block in response to determining to free space in the translation cache; and discard the first translated code block in response to determining to discard the first translated code block as a function of the first one of the cost-benefit metrics.

16. The at least one storage or at least one storage disk of claim 15, wherein the instructions are to cause the computing device to determine the first one of the cost-benefit metrics based on a measurement of the translation time for the corresponding one of the translated code blocks.

17. The at least one storage device or at least one storage disk of claim 15, wherein the instructions are to cause the computing device to determine the first one of the cost-benefit metrics based on an estimate of the translation time for the corresponding one of the translated code blocks.

18. The at least one storage device or at least one storage disk of claim 15, wherein the instructions are to cause the computing to determine the first one of the cost-benefit metrics by determining the performance benefit for the corresponding one of the translated code blocks based on an analytical model of the computing device.

19. The at least one storage device or at least one storage disk of claim 15, wherein the instructions are to cause the computing device to:

increment an iteration count in response to determining to free space in the translation cache;

determine whether to discard the first translated code block in the translation cache as a function of the first one of the cost-benefit metrics of the first translated code block and the iteration count; and discard the first translated code block in response to determining to discard the first translated code block as a function of the first one of the cost-benefit metrics of the first translated code block and the iteration count.

20. The at least one storage device or at least one storage disk of claim 19, wherein the instructions are to cause the computing device to determine whether to discard the first translated code block by:

determining whether the iteration count modulo the first one of the cost-benefit metrics of the first translated code block does not equal zero; and skipping a discard of the first translated code block in response to determining that the iteration count modulo the first one of the cost-benefit metrics of the first translated code block does not equal zero.

* * * * *

UNITED STATES PATENT AND TRADEMARK OFFICE
CERTIFICATE OF CORRECTION

| | |
|---|---|
| PATENT NO. | : 10,983,773 B2 |
| APPLICATION NO. | : 16/378641 |
| DATED | : April 20, 2021 |
| INVENTOR(S) | : Paul Caprioli and Jeffrey J. Cook |

It is certified that error appears in the above-identified patent and that said Letters Patent is hereby corrected as shown below:

In the Claims

Column 13, Lines 11-12 (Claim 1): Delete "a processor, causing the processor to execute"

Column 14, Line 24 (Claim 9): Replace "one device" with --one storage device--

Column 14, Line 37 (Claim 9): Delete "comprises"

Signed and Sealed this
Fifth Day of July, 2022

Katherine Kelly Vidal

Katherine Kelly Vidal
*Director of the United States Patent and Trademark Office*